April 4, 1967 K. N. SHISTOVSKY 3,312,142

OPTICAL PLANETARIUM

Filed March 2, 1964 5 Sheets-Sheet 1

April 4, 1967 K. N. SHISTOVSKY 3,312,142

OPTICAL PLANETARIUM

Filed March 2, 1964 5 Sheets-Sheet 3

April 4, 1967 K. N. SHISTOVSKY 3,312,142

OPTICAL PLANETARIUM

Filed March 2, 1964 5 Sheets-Sheet 4

United States Patent Office 3,312,142
Patented Apr. 4, 1967

3,312,142
OPTICAL PLANETARIUM

Konstantin Nikolaevich Shistovsky, Moscow, U.S.S.R., assignor to Moscowsky Planetary Filed Mar. 2, 1964, Ser. No. 348,667
4 Claims. (Cl. 88—24)

This invention relates to planetariums intended for projecting on a dome-like screen images, forming a representation of heavens with stars comprising a system of projectors symmetrically arranged in two spherical casings and two cylindrical frames, which can revolve on a horizontal shaft and a driving means effecting periodic rotation of the whole system to demonstrate planetary and stellar motions.

Planetariums of this type known hitherto usually are not provided with means for demonstrating solar and lunar eclipses and do not demonstrate planetary motions with sufficient clearness.

In a planetarium constructed in accordance with the present invention a number of novel effects can be attained when demonstrating astronomic phenomena.

One of the novel features of the invention is that special disc means are provided for demonstrating solar eclipses and eclipses of the Moon, each of said disc means including an annulus having a toothed periphery. The disc means are each eccentrically disposed before the objective of projector, and each disc means annulus carries a transparent screen provided with black or coloured shields, arranged in a strictly definite order.

Another novel feature is that special means for demonstration the phases of the Moon are also provided, said means comprising a disc mounted in front of the objective of a projector, said disc having slides representing phases of the Moon and being automatically turned by a mechanism, effecting diurnal rotation of the whole system.

The proposed invention provides sharp and clear images of the planets demonstrated on the screen due to the use of an optical system with long focal distance, comprising two parallel tubes connected by two mirrors effecting a 180° turn of the light beam.

A common shutter is also provided for dimming the stars below the horizon designed as a rotatable hemispherical cup with a counterweight for constantly maintaining it in a horizontal position.

Easy centering of the whole system is provided by means of electrical adjusting lights mounted on the opposite ends of the horizontal shaft of the planetarium.

In the proposed planetarium the objectives of the projectors are provided with semi-transparent mirror attachments for eliminating the possibility of dimming said objectives by the elements of the framework of the planetarium. In accordance with the invention it is possible to project a halo around the image of the Sun on the screen due to a flat round glass, matted at the center and transparent at the periphery, disposed before the objective of the projector. The nature of the invention will be understood from the discription given below and the accompanying drawings in which.

Figure 1:
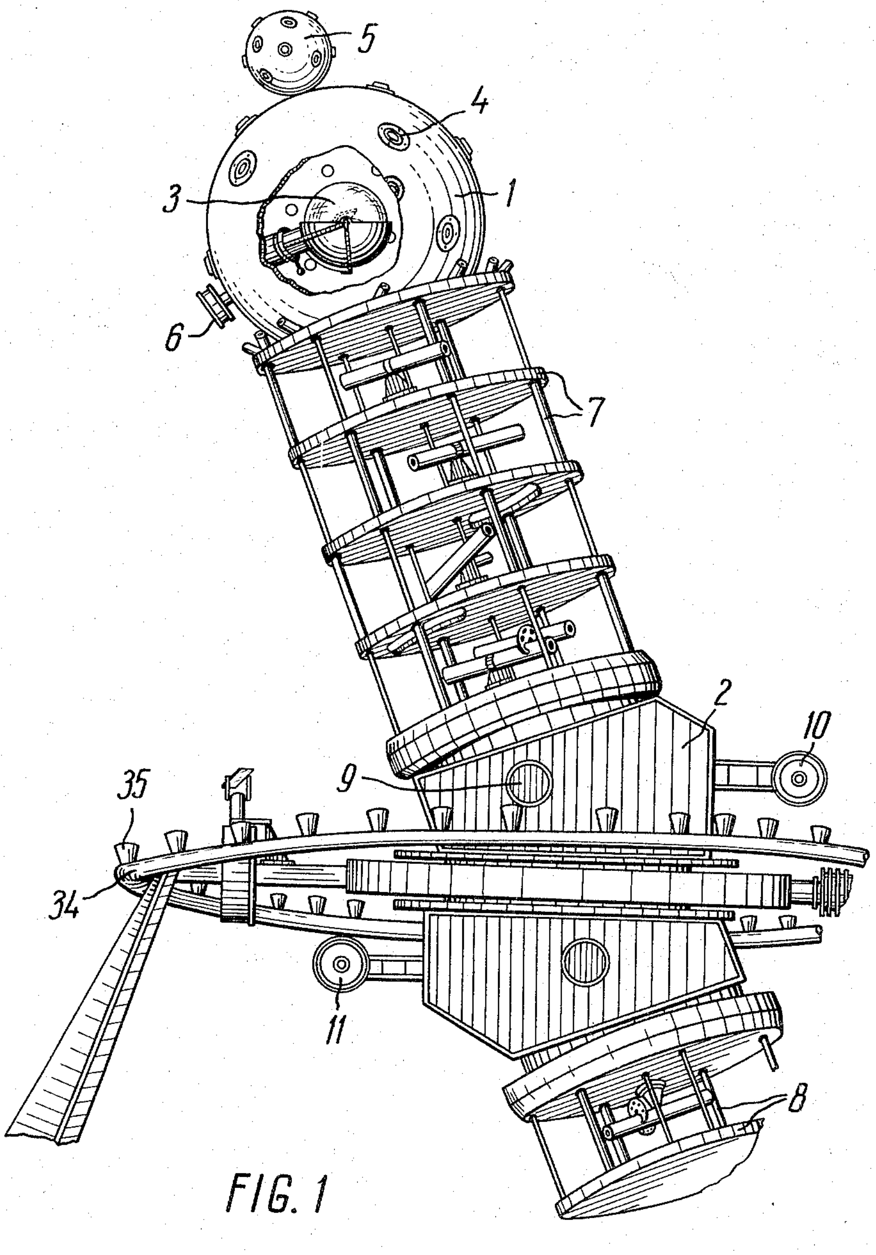
FIG. 1 is an elevation view of the upper part of the planetarium.

The planetarium (FIG. 1) comprises a system of projectors arranged symmetrically with respect to the horizontal axis. It comprises two spherical casings 1 (only one being shown in the drawing) symmetrically disposed with respect to central part 2 and serving for projecting on a dome-like screen the representation of heavens with stars of the Northern and Southern Hemispheres.

Inside each casing a light source 3 is disposed and on the surface of said casings projectors 4 are mounted in which slides are used, made on a photographic film, placed between two plano-parallel glass plates and giving, when projected on the screen, a picture of heavens, with stars.

On each said spherical casing projectors 5 and 6 are also mounted, projector 5 serving to project on the screen the names of constellations and projector 6 serving to project the Milky Way of the Northern and Southern Hemispheres respectively.

Two cylindrical frames 7 and 8 adjoin said spherical casings, each said cylindrical frame having four sections in which projectors are arranged to demonstrate the planets (Mercury, Venus, mean Sun, Sun, Moon, Mars, as well as Jupiter and Saturn).

Between said cylindrical frames, mechanisms 9, 10 and 11, are arranged for effecting the motion of precession, and for simulating the annual motion and the diurnal rotation of the entire system, respectively.

In the frame 7 a device for demonstrating solar eclipses is mounted. This device (FIG. 2) comprises a disc means having a toothed annulus 12 engaged with a rotating worm 13 and carrying a transparent screen 14 having a plurality of black shields 15 arranged in a predetermined order. The toothed annulus 12 is preferably formed by a ring gear, the outer surface of which is toothed and the inner surface of which serves to mount the screen 14.

Figure 2:
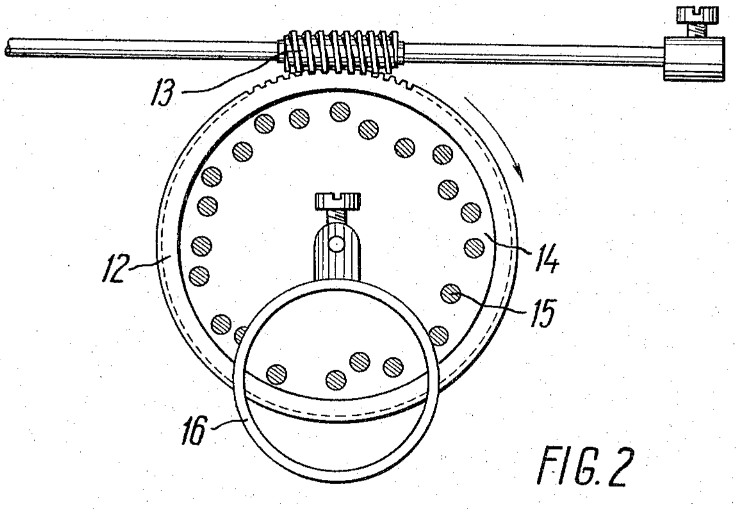
FIG. 2 is a schematic view of means for demonstrating solar eclipses.

The solar eclipse disc means of FIG. 2 is mounted eccentrically with respect to the objective 16 of the projector. As the screen 14 rotates by inter-engagement of the worm 13 and teeth on the annulus 12, the image of the Sun presented by the projector is periodically dimmed by the shields 15 which makes it possible to demonstrate partial, annular and total solar eclipses.

Figure 3:
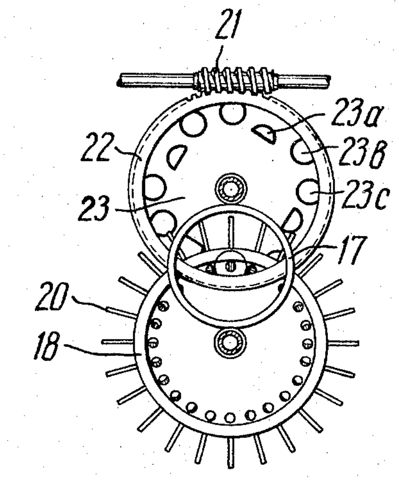
FIGS. 3 and 4 are two views of means for demonstrating eclipses and phases of the Moon.
Figure 4:
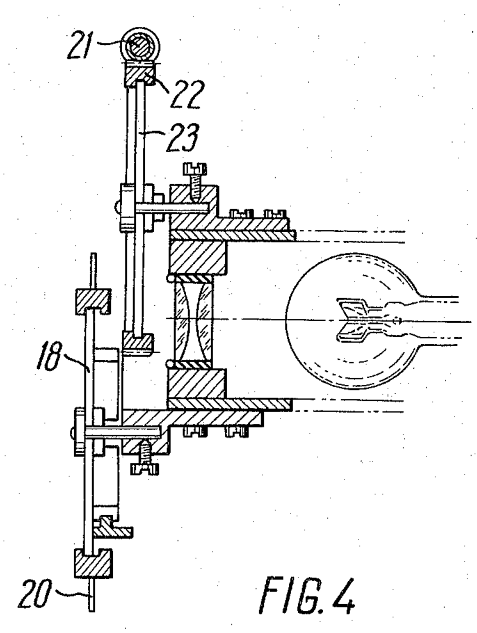
Figure 5:
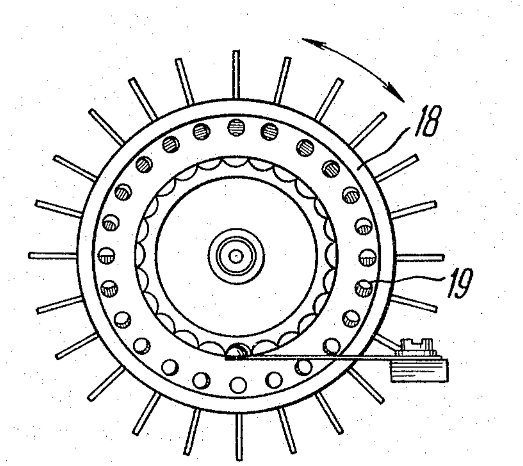
FIG. 5 shows a disc for demonstrating phases of the Moon.

In the frame 8 a device is also mounted for demonstrating eclipses and phases of the Moon (FIGS. 3 and 4). The device comprises a transparent disc 18 with slides 19 (FIG. 5) representing phases of the Moon, said disc being disposed eccentrically with respect to objective 17 of the projector.

At its periphery, disc 18 is provided with twenty-four spokes 20 (FIG. 3) which co-operate with the mechanism (not shown in the drawing) simulating diurnal rotation of the system in such a manner that in the process of such diurnal rotation each time the disc is automatically turned by an angle, the arc of which is equal to the spacing between two spokes and brings the next slide with a new phase of the Moon before objective 17 (FIG. 4).

Figure 6:
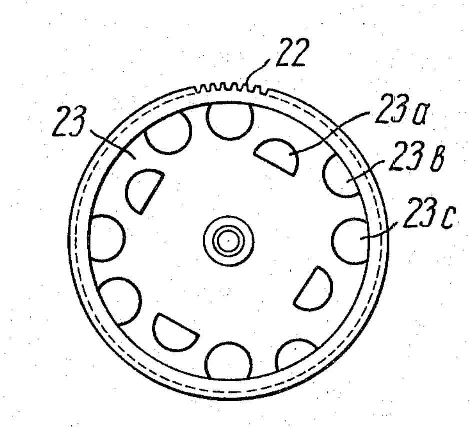
FIG. 6 shows a disc for demonstrating eclipses of the Moon.

The device for demonstrating eclipses and phases of the Moon includes a disc means having an annulus 22 with a toothed periphery rotated by a worm-gear 21 and positioned above the disc 18. The annulus 22 carries a transparent disc 23 provided with coloured shields 23*a*, 23*b* and 23*c* and serving to demonstrate eclipses of the Moon (FIG. 6).

Spherical casings and cylindrical frames in the proposed planetarium in accordance with the invention are much less in size as compared with similar apparatus known hitherto. In order to obtain images of stars on the dome-like screen with the same sharpness and brightness as in planetariums of bigger size, it is necessary to use optical means with long focus. To accommodate optical means with great focal length within a planetarium of smaller size, a beam-deflecting optical system is used.

Figure 7:
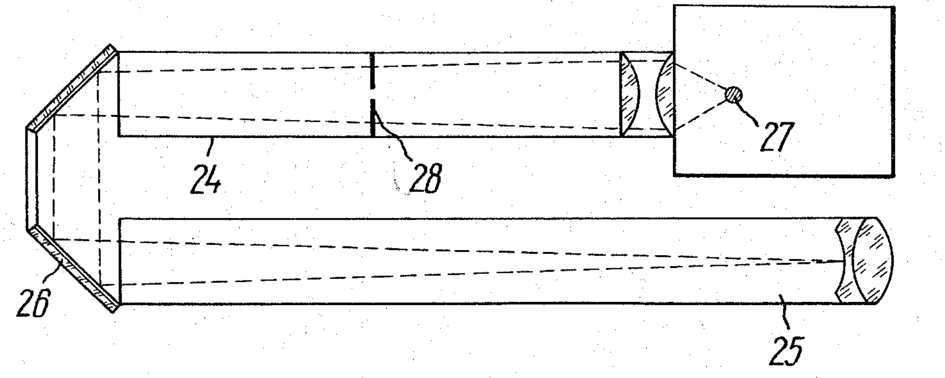
FIG. 7 is a diagram of the optics of a projector demonstrating the planets.

The optical system (FIG. 7) comprises two parallel tubes 24, 25 connected with each other by two mirrors 26 which are disposed at an angle of 45° to the direction of a light beam from the light source 27 and change the direction of the light beam by 180°. Slide 28 is disposed approximately in the middle of the first tube.

Figure 8:
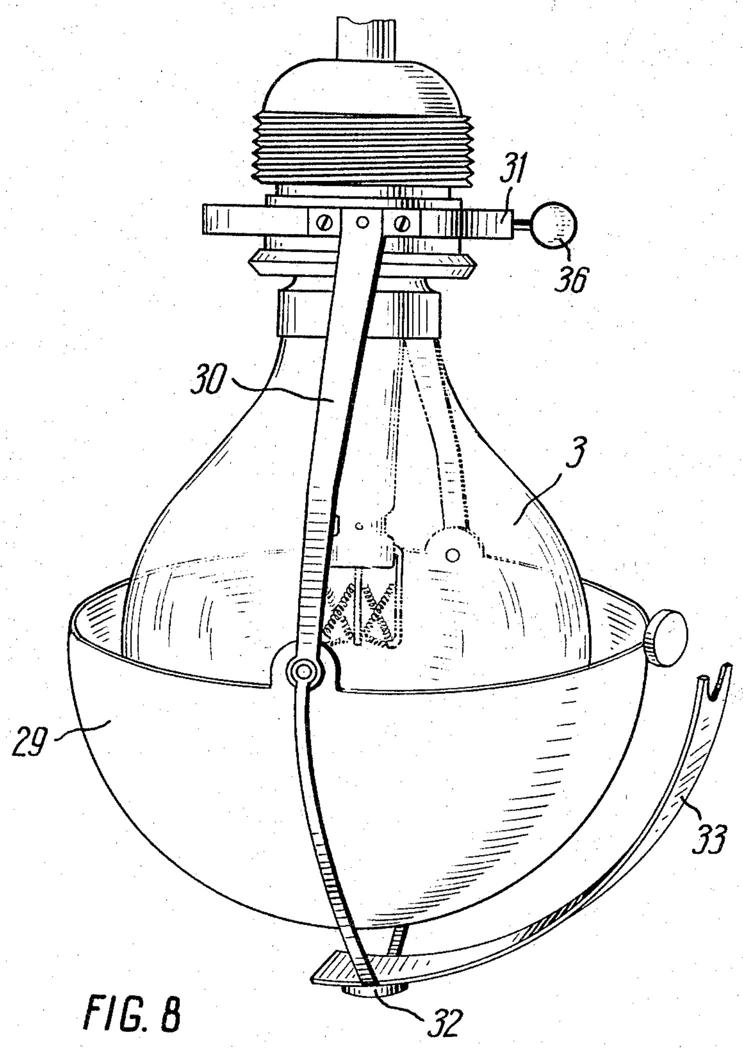
FIGS. 8 and 9 show a view of a common shutter for a light source for its lower and upper positions respectively.
Figure 9:
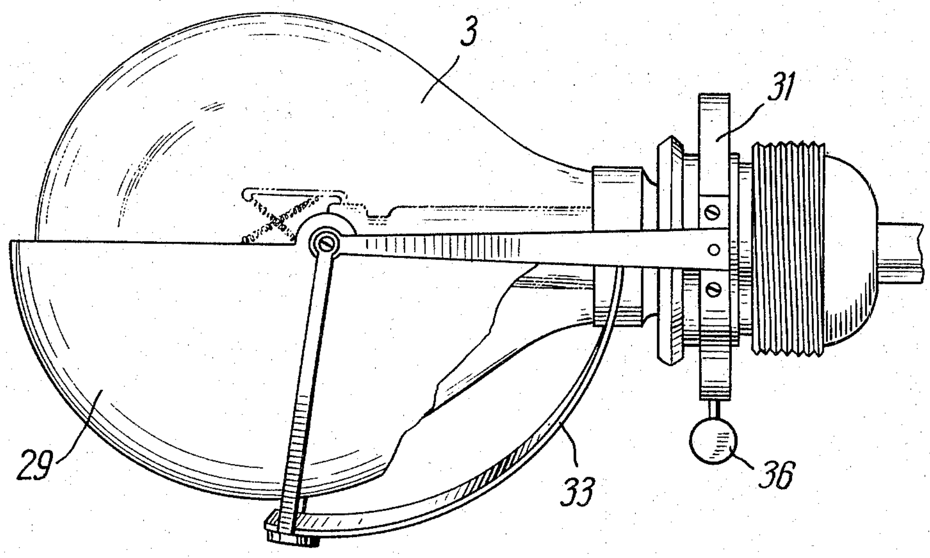

In FIGS. 8 and 9 a common shutter is shown, disposed within the spherical casings for dimming the images of the stars reaching the horizon in the process of the diurnal and annual rotation of the planetarium.

The shutter is a hemispherical cup 29 suspended on a fork 30. The latter is mounted on a ball bearing 31, disposed in the socket of light source 3. A counterweight 32 is attached to the fork. The cup 29 is provided with a slot and with a movable shield 33 for shutting this slot. Due to such an arrangement the cup 29 always shuts the lower portion of the light source 3 in any position of the latter (during diurnal and annual rotation of the planetarium) and thereby a sharp line of the horizon is obtained. The images of the stars reaching the horizon are dimmed by this shield. In FIG. 8 the shutter is shown when the light source is in its vertical position, i.e. when the shutter covers its lower half. In FIG. 9 the light source is shown in a different position, the cup 29 with its slot comes into engagement with the socket of the light source 3, the shield 33 is shifted and the lower half of the light source is thus dimmed again. In FIG. 1 ring 34 is shown with lights 35 for illuminating the hall in white, blue, red and various combinations thereof.

Some difficulties arise when the planetarium is being assembled in determination of proper position of the whole system in the center of a hall and particularly in adjusting the position of the horizontal shaft.

In accordance with the invention two electrical adjusting lights are mounted on the opposite ends of the horizontal shaft. The projection of these lights on the dome screen makes it possible to determine the degree of accuracy with which the planetarium is oriented in the east-west direction.

To preclude dimming of the objectives of the projectors by the cylindrical frames and by the parts thereof, semi-transparent mirror glass attachments are provided which can be fixed on the objectives of the projectors for attaining clear images of the stars on the screen.

The halo around the image of the Sun on the screen in the planetarium is produced by using a flat round glass plate, matted at the center portion and transparent at a periphery, which is placed before the slide representing the Sun.

What is claimed is:

1. In an optical planetarium, an improvement for simulating a full range of solar and lunar eclipses, comprising:

a Sun image projector means;

a solar eclipse forming disc means disposed adjacent said Sun image projector means;

said solar eclipse forming disc means including a first annular element having a toothed periphery and a first driving means engaged with said toothed periphery for selectively rotating said first annular element;

a first transparent screen mounted within said first annular element and being rotatable therewith;

said first transparent screen carrying an arranged plurality of black shields;

said solar eclipse forming disc means being mounted eccentrically with respect to the optical axis of said Sun image projector means to permit said black shields to individually intercept the Sun image projected by said projector means;

said first driving means being operative to rotate said first annular element and said first transparent screen to bring a selected one of said black shields into interception with said Sun image projected by said projector means to thereby display a selected type of solar eclipse;

a Moon image projector means;

a lunar eclipse forming disc means disposed adjacent said Moon image projector means;

said lunar eclipse forming disc means including a second annular element having a toothed periphery and a second driving means engaged with said toothed periphery for selectively rotating said second annular element;

a second transparent screen mounted within said second annular element and being rotatable therewith;

said second transparent screen carrying an arranged plurality of colored shields;

said lunar eclipse forming disc means being mounted eccentrically with respect to the optical axis of said Moon image projector means to permit said colored shields to individually intercept the Moon image projected by said projector means;

said second driving means being operative to rotate said second annular element and said second transparent screen to bring a selected one of said colored shields into interception with said Moon image projected by said projector means to thereby display a selected type of lunar eclipse.

2. An improvement as defined in claim 1 further including means for simulating Moon phase succession, comprising:

a third transparent screen;

a plurality of slides representing various phases of the Moon mounted upon said third transparent screen;

said third transparent screen being juxtaposed to said second transparent screen in partially overlapping relationship, said third transparent screen being mounted eccentrically with respect to the optical axis of said Moon image projector means to permit said Moon phase slides to individually intercept the Moon image projected by said projector means, whereupon any selected Moon phase can be displayed and any selected type of lunar eclipse can be imposed thereupon.

3. An improvement defined in claim 2 further including mounting means for said third transparent screen, a diurnal rotation mechanism for simulating the daily rotation of the Earth, and means cooperatively interengaging said diurnal rotation mechanism with said mounting means whereby each diurnal rotation will cause a discrete advance of said third transparent screen thereby appropriately advancing said Moon phase slides.

4. The improvement defined in claim 1 further including a star image projector means, said star image projector means comprising:

a light source including a substantially spherical casing means which transmits light for creating star images;

a shutter means juxtaposed to said light source;

said shutter means including a hemispherical cup member surrounding substantially one half of said spherical casing means; and means mounting said hemispherical cup member for movement relative to said casing means whereby, at any position of said star image projector means, said hemispherical cup member blocks off the lower half of said casing means thereby blocking the star images below the projected horizon.

References Cited by the Examiner

UNITED STATES PATENTS

| | | | |
|---|---|---|---|
| 1,172,865 | 2/1916 | Bizzoni | 88—27 |
| 1,503,488 | 8/1924 | Craver | 88—27 |
| 1,693,969 | 12/1928 | Villiger et al. | 88—24 |
| 1,736,860 | 11/1929 | O'Brien et al. | 40—34 X |
| 2,632,359 | 3/1953 | Spitz | 88—24 |
| 2,748,652 | 6/1956 | Bauersfeld et al. | 88—24 |
| 2,803,165 | 8/1957 | Sargenti | 88—24 |

EUGENE R. CAPOZIO, *Primary Examiner.*

H. S. SKOGQUIST, *Assistant Examiner.*